(12) United States Patent
Boyd et al.

(10) Patent No.: US 7,500,071 B2
(45) Date of Patent: Mar. 3, 2009

(54) METHOD FOR OUT OF USER SPACE I/O WITH SERVER AUTHENTICATION

(75) Inventors: William Todd Boyd, Poughkeepsie, NY (US); John Lewis Hufferd, San Jose, CA (US); Agustin Mena, III, Austin, TX (US); Renato J. Recio, Austin, TX (US); Madeline Vega, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 11/216,879

(22) Filed: Aug. 31, 2005

(65) Prior Publication Data

US 2007/0050591 A1 Mar. 1, 2007

(51) Int. Cl.
*G06F 12/00* (2006.01)

(52) U.S. Cl. .................. 711/163; 709/216; 711/202

(58) Field of Classification Search .................. 711/163
See application file for complete search history.

(56) References Cited

U.S. PATENT DOCUMENTS

| 4,796,178 A | 1/1989 | Jennings et al. |
|---|---|---|
| 5,313,592 A | 5/1994 | Buondonno et al. |
| 5,369,749 A | 11/1994 | Baker et al. |
| 5,377,337 A | 12/1994 | Antognini et al. |
| 5,414,851 A | 5/1995 | Brice, Jr. et al. |
| 5,535,416 A | 7/1996 | Feeney et al. |
| 5,659,798 A | 8/1997 | Blumrich et al. |
| 5,732,269 A | 3/1998 | Compton et al. |
| 5,893,919 A | 4/1999 | Sarkozy et al. |
| 5,926,833 A | 7/1999 | Rasoulian et al. |
| 5,968,143 A | 10/1999 | Chisholm et al. |
| 5,983,301 A | 11/1999 | Baker et al. |
| 5,991,753 A | 11/1999 | Wilde |

(Continued)

FOREIGN PATENT DOCUMENTS

JP        10289158 A        10/1998

OTHER PUBLICATIONS

CICS System Definition Guide, Release 3, IBM, SC33-1682-02, Third Edition, Mar. 1999, pp. 104, 199.*

(Continued)

*Primary Examiner*—Kevin L Ellis
*Assistant Examiner*—Matthew Bradley
(74) *Attorney, Agent, or Firm*—Stephen J. Walder, Jr.; Randall J. Bluestone

(57) ABSTRACT

A method that enables user space middleware or applications to pass I/O storage requests directly to a network attached storage device via a storage server that performs authentication is provided. A mechanism is provided for using a translation protection table (TPT) data structure, which may include a file name protection table (FNPT) and file extension protection table (FEPT), or logical volume protection table (LVPT), to control user space and out of user space Input/Output (I/O) operations. The storage server performs authentication of an application instance's request to open an operating system logical volume and, upon being authenticated, permits the application instance to submit I/O storage requests via the TPT to the opened OS logical volume. I/O storage requests are translated into storage commands using the TPT and the storage commands are encapsulated for transmission via one or more networks to the storage server.

15 Claims, 10 Drawing Sheets

U.S. PATENT DOCUMENTS

| | | | |
|---|---|---|---|
| 6,003,123 A | 12/1999 | Carter et al. | |
| 6,009,476 A | 12/1999 | Flory et al. | |
| 6,047,307 A | 4/2000 | Radko | |
| 6,061,794 A | 5/2000 | Angelo et al. | |
| 6,092,168 A | 7/2000 | Voigt | |
| 6,115,772 A | 9/2000 | Crater | |
| 6,145,030 A | 11/2000 | Martwick | |
| 6,192,408 B1 | 2/2001 | Vahalia et al. | |
| 6,247,024 B1 | 6/2001 | Kincaid | |
| 6,345,301 B1 | 2/2002 | Burns et al. | |
| 6,345,347 B1 | 2/2002 | Biran | |
| 6,360,282 B1 | 3/2002 | Langerman et al. | |
| 6,446,209 B2 | 9/2002 | Kern et al. | |
| 6,493,825 B1 | 12/2002 | Blumenau et al. | |
| 6,535,518 B1 | 3/2003 | Hu et al. | |
| 6,550,061 B1 | 4/2003 | Bearden et al. | |
| 6,553,412 B1 | 4/2003 | Kloba et al. | |
| 6,578,122 B2* | 6/2003 | Beukema et al. | 711/163 |
| 6,594,787 B1 | 7/2003 | Chesson | |
| 6,654,818 B1 | 11/2003 | Thurber | |
| 6,665,747 B1 | 12/2003 | Nazari | |
| 6,704,831 B1 | 3/2004 | Avery | |
| 6,718,372 B1 | 4/2004 | Bober | |
| 6,721,847 B2 | 4/2004 | Hursey | |
| 6,751,680 B2 | 6/2004 | Langerman et al. | |
| 6,753,873 B2 | 6/2004 | Dixon et al. | |
| 6,789,143 B2 | 9/2004 | Craddock et al. | |
| 6,816,891 B1 | 11/2004 | Vahalia et al. | |
| 6,834,332 B2 | 12/2004 | Craddock et al. | |
| 6,842,784 B1 | 1/2005 | Black | |
| 6,845,403 B2 | 1/2005 | Chadalapaka | |
| 6,996,638 B2 | 2/2006 | Brice, Jr. et al. | |
| 7,124,207 B1 | 10/2006 | Lee et al. | |
| 7,272,676 B2 | 9/2007 | Saito et al. | |
| 7,272,832 B2 | 9/2007 | Gardner | |
| 2002/0004890 A1 | 1/2002 | Ofek et al. | |
| 2002/0059309 A1 | 5/2002 | Loy et al. | |
| 2002/0071567 A1* | 6/2002 | Kurn et al. | 380/286 |
| 2002/0078239 A1 | 6/2002 | Howard et al. | |
| 2002/0083224 A1 | 6/2002 | Langerman et al. | |
| 2002/0091841 A1 | 7/2002 | Beukema | |
| 2002/0099879 A1 | 7/2002 | Bayer et al. | |
| 2002/0104008 A1* | 8/2002 | Cochran et al. | 713/200 |
| 2002/0124013 A1 | 9/2002 | Loy et al. | |
| 2002/0124148 A1 | 9/2002 | Beukema et al. | |
| 2002/0147916 A1* | 10/2002 | Strongin et al. | 713/193 |
| 2002/0169938 A1 | 11/2002 | Scott et al. | |
| 2002/0194408 A1 | 12/2002 | Capps, Jr. et al. | |
| 2003/0009484 A1 | 1/2003 | Hamanaka et al. | |
| 2003/0018877 A1 | 1/2003 | Gaskins et al. | |
| 2003/0023791 A1 | 1/2003 | Suzuki et al. | |
| 2003/0078944 A1 | 4/2003 | Yamauchi et al. | |
| 2003/0093625 A1* | 5/2003 | Beukema et al. | 711/147 |
| 2003/0105936 A1 | 6/2003 | Stakutis et al. | |
| 2003/0110205 A1 | 6/2003 | Johnson | |
| 2003/0110445 A1 | 6/2003 | Khaleque | |
| 2003/0115221 A1 | 6/2003 | Goode et al. | |
| 2003/0182422 A1 | 9/2003 | Bradshaw et al. | |
| 2003/0200298 A1 | 10/2003 | Su et al. | |
| 2003/0229690 A1* | 12/2003 | Kitani et al. | 709/223 |
| 2003/0233564 A1 | 12/2003 | LaRose et al. | |
| 2004/0003137 A1 | 1/2004 | Callender et al. | |
| 2004/0010701 A1 | 1/2004 | Umebayashi et al. | |
| 2004/0049580 A1 | 3/2004 | Boyd et al. | |
| 2004/0049603 A1 | 3/2004 | Boyd et al. | |
| 2004/0054866 A1* | 3/2004 | Blumenau et al. | 711/202 |
| 2004/0078521 A1 | 4/2004 | Hawks et al. | |
| 2004/0083308 A1 | 4/2004 | Sebastian et al. | |
| 2004/0165607 A1 | 8/2004 | Carnevale et al. | |
| 2004/0193825 A1 | 9/2004 | Garcia et al. | |
| 2004/0210598 A1 | 10/2004 | Sturms | |
| 2005/0021848 A1 | 1/2005 | Jorgenson | |
| 2005/0044375 A1* | 2/2005 | Paatero et al. | 713/176 |
| 2005/0066076 A1 | 3/2005 | Best et al. | |
| 2005/0091029 A1 | 4/2005 | Traut | |
| 2005/0091383 A1 | 4/2005 | Bender et al. | |
| 2005/0138230 A1 | 6/2005 | Raisch | |
| 2005/0172040 A1 | 8/2005 | Hashimoto | |
| 2005/0246453 A1 | 11/2005 | Erlingsson et al. | |
| 2005/0289193 A1 | 12/2005 | Arrouye et al. | |
| 2006/0168365 A1 | 7/2006 | Martinez et al. | |
| 2006/0212608 A1 | 9/2006 | Arndt et al. | |
| 2006/0212620 A1 | 9/2006 | Arndt et al. | |
| 2007/0130356 A1 | 6/2007 | Boucher et al. | |

OTHER PUBLICATIONS

U.S. Appl. No. 11/216,712, filed Aug. 31, 2005, Boyd et al.
U.S. Appl. No. 11/216,736, filed Aug. 31, 2005, Boyd et al.
U.S. Appl. No. 11/216,832, filed Aug. 31, 2005, Boyd et al.
"Prevent Unauthorized Access to Data in Database Servers by the Transaction Manager", IBM Technical Disclosure No. NA9402629, vol. 37, Issue No. 2A, Feb. 1, 2994, 4 pages.
"Asynchronous Queued I/O Processor Architecture", IBM Technical Disclosure No. NN9301265, vol. 36, Issue No. 1, Jan. 1, 1993, 12 pages.
Debergalis et al., "The Direct Access File System", Proceedings of the 2nd USENIX Conference on File and Storage Technologies (FAST '03), Mar. 31-Apr. 2, 2003, pp. 175-188.
Boyd et al., "System and Method for Processor Queue to Linear Block Address Translation Using Protection Table Control Based on a Protection Domain", U.S. Appl. No. 11/135,266, filed May 23, 2005.
Boyd et al., "System and Method for Processing Block Mode I/O Operations Using a Linear Block Address Translation Protection Table", U.S. Appl. No. 11/135,257, filed May 23, 2005.
Boyd et al., "System and Method for Out of User Space Block Mode I/O Directly Between an Application Instance and an I/O Adapter", U.S. Appl. No. 11/135,541, filed May 23, 2005.
Boyd et al., "System and Method for Creation/Deletion of Linear Block Address Table Entries for Direct I/O", U.S. Appl. No. 11/135,539, filed May 23, 2005.
Boyd et al., "System and Method for User Space Operations for Direct I/O Between an Application Instance and an I/O Adapter", U.S. Appl. No. 11/135,542, filed May 23, 2005.
Boyd et al., "System and Method for Query/Modification of Linear Block Address Table Entries for Direct I/O", U.S. Appl. No. 11/135,540, filed May 23, 2005.
Boyd et al., "System and Method for Out of User Space I/O Directly Between a Host System and a Physical Adapter Using File Based Linear Block Address Translation", Serial No. Not Known, Filed Herewith.
Boyd et al., "System and Method for Processing User Space Operations Directly Between an Application Instance and an I/O Adapter", Serial No. Not Known, Filed Herewith.
Boyd et al., "System and Method for File Based I/O Directly Between an Application Instance and an I/O Adapter", Serial No. Not Known, Filed Herewith.
Arndt et al., Data Processing System, Method, and Computer Program Product for Creation and Initialization of a Virtual Adapter on a Physical Adapter that Supports Virtual Adapter Level Virtualization, U.S. Appl. No. 11/065,829, filed Feb. 25, 2005.
Fiuczynski et al., "SPINE: A Safe Programm", Proceedings of the 8th ACM SIGOPS European workshop on Support for composing distributed applications. Sep. 1998, 9 pages.

* cited by examiner

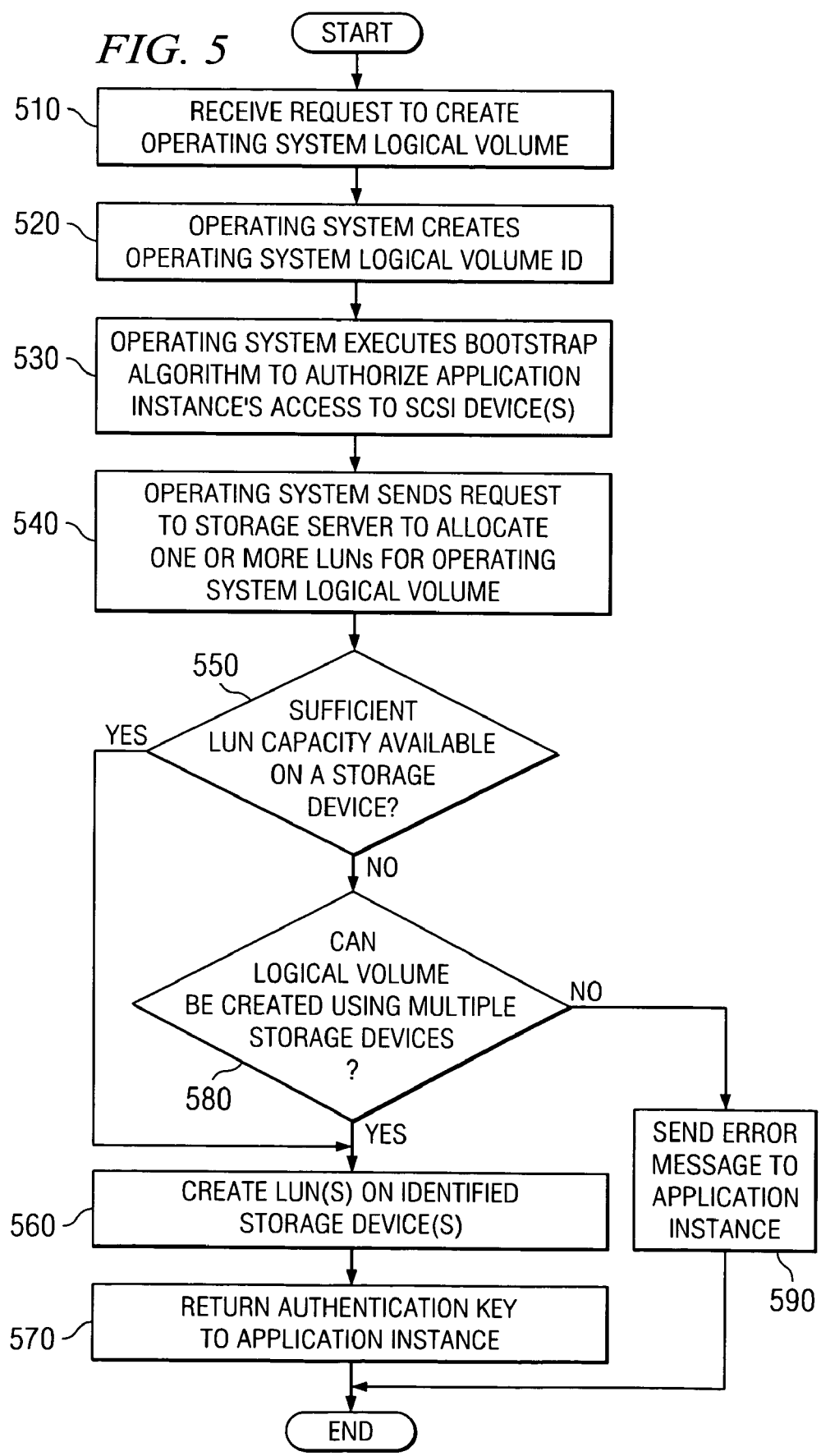

METHOD FOR OUT OF USER SPACE I/O WITH SERVER AUTHENTICATION

BACKGROUND OF THE INVENTION

1. Technical Field

The present invention relates generally to communication protocols between a host computer and a storage server via an input/output (I/O) adapter. More specifically, the present invention is directed to a system and method for enabling user space middleware or applications to pass I/O storage requests to a storage server which authenticates the I/O storage requests before processing them with respect to particular storage devices associated with the storage server. Moreover, the present invention is directed to a system and method for enabling user space middleware or applications to pass such I/O storage requests to the storage server without run-time involvement from the local Operating System (OS), or, in a virtual system, the local hypervisor.

2. Description of Related Art

Operating systems, according to the present state of the art, do not permit user space middleware or applications, such as a database, to directly access persistent storage that is identified through the Operating System's Raw Mode Storage I/O interface or the Operating System's Logical Volume Storage I/O interface. As a result, the user space middleware must invoke an Operating System (OS) call and incur several task switches every time an I/O operation is performed. The first task switch is caused when the middleware or application transfers a storage request to the OS. A second task switch occurs when the OS passes control back to the user space middleware or application, after the OS completes processing the middleware or application storage request and passes the storage request to the storage adapter.

A third task switch occurs when the storage adapter completes the associated I/O storage operations and interrupts the processing being performed by an application so that the OS may process the storage adapter's completion. The final task switch occurs when the OS finishes processing the storage adapter's completion and gives control back to the middleware or application that transferred the storage request to the OS. In addition to these task switches the storage adapter typically has a single request queue to process work from the operating system.

The four task switches described above may be considered wasted processor cycles because all work on the thread being switched is stopped until the task switch is complete. On some servers, the number of storage operations performed by a user space middleware or application program may be quite large. Modern, high-end servers may have millions of these operations per second, resulting in several million task switches per second.

SUMMARY OF THE INVENTION

In one illustrative embodiment, the present invention provides a method, which is implemented in a data processing system, for performing input/output (I/O) operations with a remotely located storage system. With this method, an I/O request is received from an application instance. The I/O request includes a key value for identifying an entry in a translation protection table data structure. The I/O request targets a portion of a storage device in the remotely located storage system upon which an I/O operation is to be performed.

The method further comprises retrieving an entry from a translation protection table based on the key value. The entry includes an identifier of the storage device and a logical unit number corresponding to the portion of the storage device targeted by the I/O request. Based on the identifier of the storage device and the logical number retrieved from the entry from the translation protection table, a storage command is generated and placed in a storage command queue for transmission to the remotely located storage system.

The method also comprises receiving, from the application instance, a request to open the portion of the storage device. The request includes an authentication key. A command, having the authentication key is sent to the remotely located storage system to open the portion of the storage device and results of the command to open the portion of the storage device are returned to the application instance.

Furthermore, the method comprises receiving, from the application instance, a request to allocate a logical unit of the storage device to the portion of the storage device for input/output operations of the application instance and sending an allocate command, generated based on the received request to allocate the logical unit, to the remotely located storage system. A response is received from the remotely located storage system identifying an authentication key for use in opening the logical unit of the portion of the storage device for I/O operations. The remotely located storage system performs authentication on the command to open the portion of the storage device based on the authentication key. The authentication key is an authentication key generated and provided by the remotely located storage system to the application instance and is stored in a storage device of the data processing system that is only accessible by the application instance.

In another illustrative embodiment, in addition to the above, the method comprises determining if there are any active transactions on the entry in the translation protection table data structure. The data processing system modifies the entry in the translation protection table data structure only if there are no active transactions on the entry.

These and other features and advantages will be described in, or will become apparent to those of ordinary skill in the art in view of, the following detailed description of the illustrative embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart outlining an exemplary operation of one exemplary embodiment of the present invention when creating a logical volume and its associated logical units for access by an application instance;

DETAILED DESCRIPTION OF THE PREFERRED EMBODIMENTS

Figure 1:
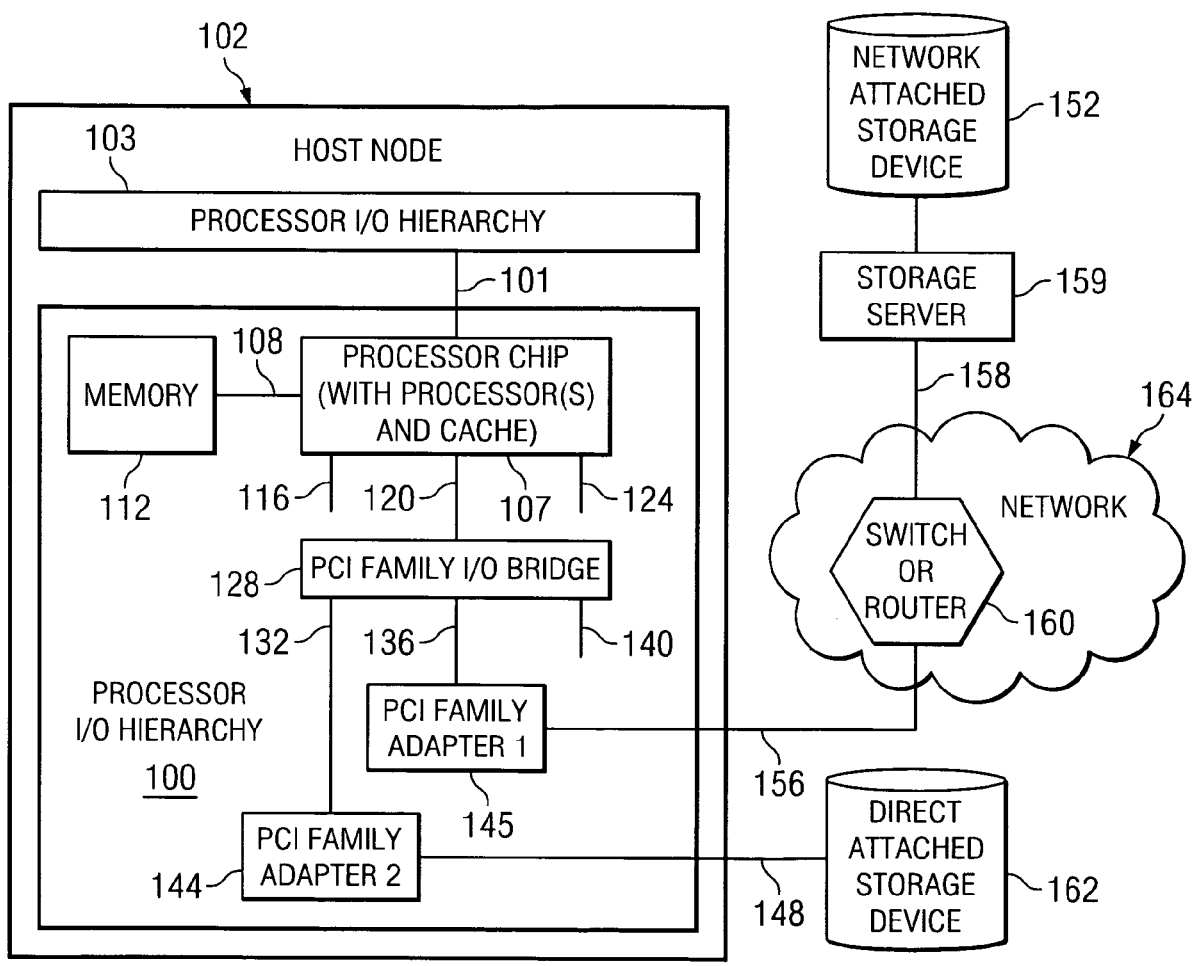
FIG. 1 is a functional block diagram of a host processor node in accordance with an exemplary embodiment of the present invention.

The present invention applies to any general or special purpose host that accesses portions of remotely located storage devices associated with a storage server. For example, the present invention applies to a host that communicates, via an I/O adapter, such as a PCI family I/O adapter, virtual I/O adapter, endpoint device, virtual endpoint device or the like, with a storage server over one or more networks. The one or more networks may consist of end nodes, switches, routers and links interconnecting these components. The network links may be Fiber Channel, Ethernet, InfiniBand, Advanced Switching Interconnect, another standard storage network interconnect, or a proprietary link that uses proprietary or standard protocols. While the depictions and description hereafter will make reference to particular arrangements of networks and host nodes, it should be appreciated that the following exemplary embodiments are only exemplary and modifications to the arrangements specifically depicted and described may be made without departing from the spirit and scope of the present invention.

It is important to note that the present invention can take the form of an entirely hardware embodiment, an entirely software embodiment or an embodiment containing both hardware and software elements. In an exemplary embodiment, the present invention is implemented in software, which includes but is not limited to firmware, resident software, microcode, and the like.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters are coupled to the system to enable the data processing system to become coupled to other data processing systems or remote printers or storage devices through intervening private or public networks. Modems, cable modem and Ethernet cards are just a few of the currently available types of network adapters that may be used with the present invention.

With reference now to the figures, and in particular with reference to FIG. 1, a functional block diagram of a host node is depicted in accordance with one exemplary embodiment of the present invention. In this example, host node 102 includes two processor I/O hierarchies 100 and 103 which are interconnected through link 101. For ease of depicting the elements of the host node 102, only processor I/O hierarchy 100 is completely depicted with processor I/O hierarchy 103 having a similar, although not depicted, arrangement of elements as discussed hereafter.

As shown, processor I/O hierarchy 100 includes a processor chip 107 which includes one or more processors and their associated caches. Processor chip 107 is connected to memory 112 through a link 108. One of the links on the processor chip, such as link 120, connects to a PCI family I/O bridge 128. The PCI family I/O bridge 128 has one or more PCI family (PCI, PCI-X, PCI-Express, or any future generation of PCI) links that are used to connect other PCI family I/O bridges or a PCI family I/O adapter, such as PCI family adapter 1 145 and PCI family adapter 2 144, through a PCI link, such as links 132, 136, and 140. A PCI family adapter, such as PCI Family Adapter 1 145, may be used to connect to a network attached storage 152 through a network link, such as link 156 to network 164, that connects to either a switch or router 160, which in turn connects to the network attached storage 152 via link 158 and storage server 159. A PCI family adapter, such as PCI family adapter 2 144, may also be used to connect a direct attached storage device 162 through a link 148.

It is important to note that a PCI Family Adapter, such as PCI Family Adapter 1 145 or PCI Family Adapter 2 144, may be integrated with other components on the host node 102. For example, PCI family adapter 1 145 or PCI family adapter 2 144, may be integrated with PCI family I/O bridge 128. Another example is that the PCI family adapter, such as PCI family adapter 1 145 or PCI family adapter 2 144, may be integrated with processor chip 107.

With the exemplary embodiments of the present invention, the network attached storage devices and direct attached storage devices, such as network attached storage device 152 and direct attached storage device 162, are Small Computer System Interface (SCSI) storage devices. Each SCSI storage device has a unique SCSI ID number. This SCSI ID number uniquely identifies the SCSI storage device and may also be used in determining a priority associated with the SCSI storage device. Each SCSI storage device may further be broken up into logical units, identified by logical unit numbers (LUNs), e.g., eight logical units numbered 0 to 7.

In the exemplary embodiments of the present invention, the storage server 159 is an Internet Small Computer System Interface (iSCSI) storage server. The iSCSI protocol is an Internet Protocol (IP)—based storage networking standard for linking data storage facilities, developed by the Internet Engineering Task Force (IETF). By carrying SCSI commands over IP networks, iSCSI is used to facilitate data transfers over intranets and to manage storage over long distances.

With iSCSI based storage, when an end user or application sends a request, the operating system generates the appropriate SCSI commands and data request, which then go through encapsulation and, if necessary, encryption procedures. A packet header is added before the resulting IP packets are transmitted over an Ethernet connection.

When a packet is received, it is decrypted (if it was encrypted before transmission), and disassembled, separating the SCSI commands and request. The SCSI commands are sent on to the SCSI controller, and from there to the SCSI storage device. Because iSCSI is bi-directional, the protocol can also be used to return data in response to the original request.

It should be noted that in the iSCSI protocol, the operating system is required for generating the SCSI commands and data request. With the present invention, the iSCSI protocol is enabled in such a manner that the operating system need not be involved in the generation of the SCSI commands and data request, as discussed hereafter.

While the exemplary embodiments of the present invention will be described with regard to network attached storage devices and storage servers being SCSI storage devices and iSCSI storage servers, the present invention is not limited to such. Rather, other hardware interfaces may be used without departing from the spirit and scope of the present invention.

In addition, while the exemplary embodiments of the present invention will be described with regard to a PCI family adapter, it should be appreciated that the present invention is not limited to this type of adapter. Rather, the physical I/O adapter may be any type of I/O adapter including a PCI family adapter, a virtual I/O adapter, an endpoint device, a virtual endpoint device, a virtual I/O adapter endpoint device, or the like. One example of a virtual I/O adapter that may be used with the present invention is described in, for example, commonly assigned and co-pending U.S. patent application Ser. No. 11/065,829 entitled "Data Processing System, Method and Computer Program Product for Creation and Initialization of a Virtual Adapter on a Physical Adapter that Supports Virtual Adapter Level Virtualization," filed on Feb. 25, 2005, which is hereby incorporated by reference. Other types of I/O adapters may be used without departing from the spirit and scope of the present invention.

Figure 2:
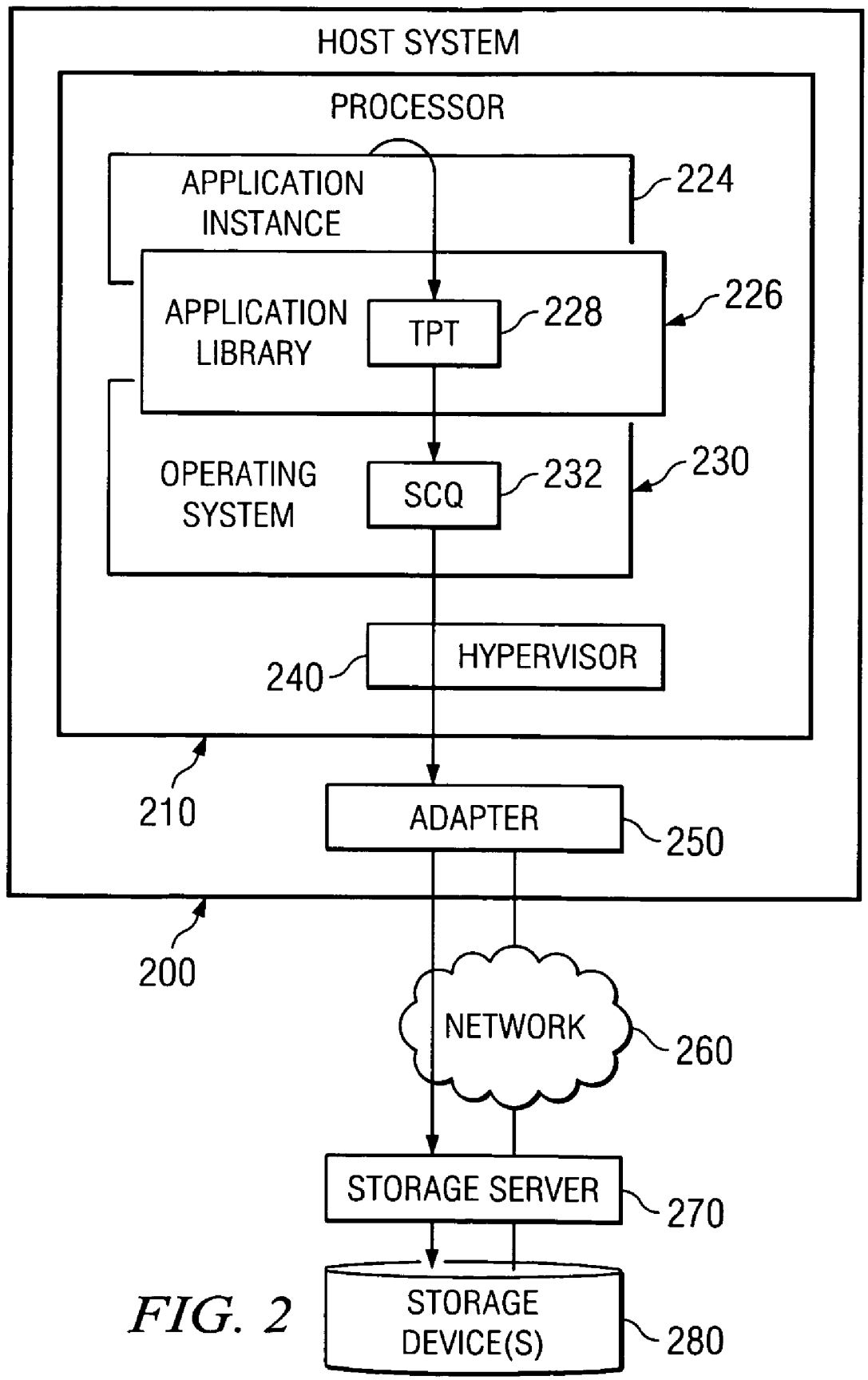
FIG. 2 is a diagram illustrating the primary operational elements of a host processor node used to enable out of user space storage I/O access in accordance with an exemplary embodiment of the present invention.

With reference now to FIG. 2, a functional block diagram of system components associated with one exemplary embodiment of the present invention is depicted. In the depicted example, physical I/O adapter 250 is an example of a PCI adapter, such as PCI family adapter 1 145 or PCI family adapter 2 144 in FIG. 1. In addition, storage server 270 and storage device(s) 280 are considered to be a iSCSI storage server and SCSI storage device(s). For ease of explanation of the present invention, the embodiment of the present invention in FIG. 2 will be described in terms of a logical volume based I/O embodiment. The way in which the present invention may be enabled for file mode I/O will be described hereafter with reference to FIG. 13.

As shown in FIG. 2, the host system 200 includes a processor 210 which runs an application instance 224 which needs to access storage locations on network attached storage device(s) 280 associated with storage server 270. Application instance 224 has an associated application library 226 which in turn includes a translation protection table (TPT) 228. The application library 226 is a collection of programs and/or data that is accessible to application instance 224 for use in submitting I/O storage requests to network attached storage device(s) directly via a physical I/O adapter 250 of the host system 200. The TPT 228 provides translation mechanisms for translating storage location identifiers in the I/O storage request generated by the application instance 224 into a storage command, e.g., SCSI command, that can be encapsulated into network protocol data packets, transmitted over one or more networks to a storage server 270, and processed by the storage server 270 to perform the requested I/O operation.

When the application instance 224 requires a portion of one or more storage device(s) 280 for data storage, the application instance 224 submits a request to the operating system (OS) 230. In response, the OS 230 creates a logical volume, assuming there is sufficient capacity for the portion of storage requested by the application instance, and returns information to the OS 230 identifying the logical volume that has been allocated to the application instance 224. This information may include, for example, a storage device identifier number, a logical unit number, an authentication key, and the like. The OS 230 generates one or more entries in the TPT 228 based on this information. The OS 230 may then return key values to the application instance which may be used by the application instance to submit I/O storage requests directed to the allocated logical volume.

After allocation of the logical volume for use by the application instance 224, the application instance 224 may open the logical volume and submit I/O storage requests targeting the logical volume directly. That is, the application instance 224 may generate an I/O storage logical volume open request having the key values provided to it for opening the logical volume for a current session. The application instance 224 invokes the application library 226 to perform translation of the I/O storage logical volume request into a storage command that can be processed by the storage server 270 to thereby open the logical volume for access during a session between the application instance 224 and the storage server 270. As part of this opening process, the storage server 270 may perform authentication of the open I/O request based on an authentication key passed to the storage server 270 by the application instance 224. Thereafter, the application instance 224 may submit I/O storage requests to the opened logical volume via translation by the TPT 228 into appropriate storage commands that are encapsulated into network data packets, transmitted to the storage server 270, and processed by the storage server 270 to perform I/O operations on the storage device(s) 280.

Based on information in the "open" I/O storage request from the application instance 224, the application library 226 looks up storage device information in the TPT 228 and generates a storage command based on the retrieved information from the TPT 228. As mentioned above, the "open" storage command may include an authentication key passed to the application library 228 by the application instance 224. This authentication key may be obtained from the TPT 228, for example, based on the key value passed into the application library 226 by the I/O request from the application instance 224. Alternatively, the application instance 224 itself may have a related register or other storage device that stores the authentication key such that the application instance 224 may supply the authentication key for the "open" storage command. The "open" storage command is placed in the storage command queue 232 and is eventually dispatched, by the adapter 250, to the storage server 270.

The storage server 270 receives the open storage command and performs authentication on the open storage command to ensure that the application instance 224 may be granted access to the portions of storage device(s) 280 referenced by the open storage command. Such authentication may be performed based on the authentication key included in the open storage command. The storage server 270 may perform a lookup, in a local data structure, of an entry corresponding to an identifier of a portion of storage device(s) 280 targeted by the storage command. An associated authentication key in the identified entry may then be compared against the authentication key received in the open storage command.

If the two keys match, the open storage command is permitted to be processed by the storage server and thereby, the corresponding logical volume is opened for access during a current session between the application instance 224 and the storage server 270. Thereafter, subsequent I/O storage requests may be submitted by the application instance 224, which are then converted to storage commands, encapsulated in network data packets, transmitted to the storage server, and processed by the storage server to execute I/O operations on the LUN associated with the logical volume in the storage device(s) 280. If the two keys do not match, then opening of the logical volume for access by the application instance 224 is denied and an error message may be returned to the application instance 224.

As will be described with reference to FIG. 13, in another exemplary embodiment, the application instance 224 submits I/O storage requests using the file system associated with the operating system 230. That is, the I/O storage requests reference files that are targeted by the application instance 224 and whose data is to be written to, or read from, the storage device(s) 280. As such, the TPT 228 includes data structures for translating file name key values identified in the I/O storage requests to storage device identifier numbers, logical unit numbers, and the like. Based on these translations, a storage command meeting protocol requirements of the storage server 270 may be generated for processing by the storage server 270.

Using the above mechanisms of the present invention, once portions of the storage device(s) 280 are allocated for access by an application instance 224, the operating system 230 need not be included in the processing of I/O storage requests between the application instance and the storage server 270. That is, the application instance 224 may open a logical volume associated with a LUN in the storage device(s) 280 and submit I/O storage requests directly to the storage server via the application library 226, storage command queue 232, and adapter 250. Thus, the context switching, that is required when the operating system 230 is involved in I/O storage request processing in prior art systems, is eliminated.

In addition, since authentication of "open" storage commands is offloaded to the storage server 270, the host system 200 need not be modified to include authentication mechanisms and utilize its resources to perform authentication when processing "open" I/O storage requests. Thus, the adapter 250 and operating system 230 of the host system 200 may remain as generally known in the prior art. The only modification needed to the host system 200 is the modification to the application library 226 to include the TPT 228 mechanism of the present invention. The storage server 270 is modified to include authentication logic for authenticating "open" storage commands and returning results of the authentication.

Figure 3:
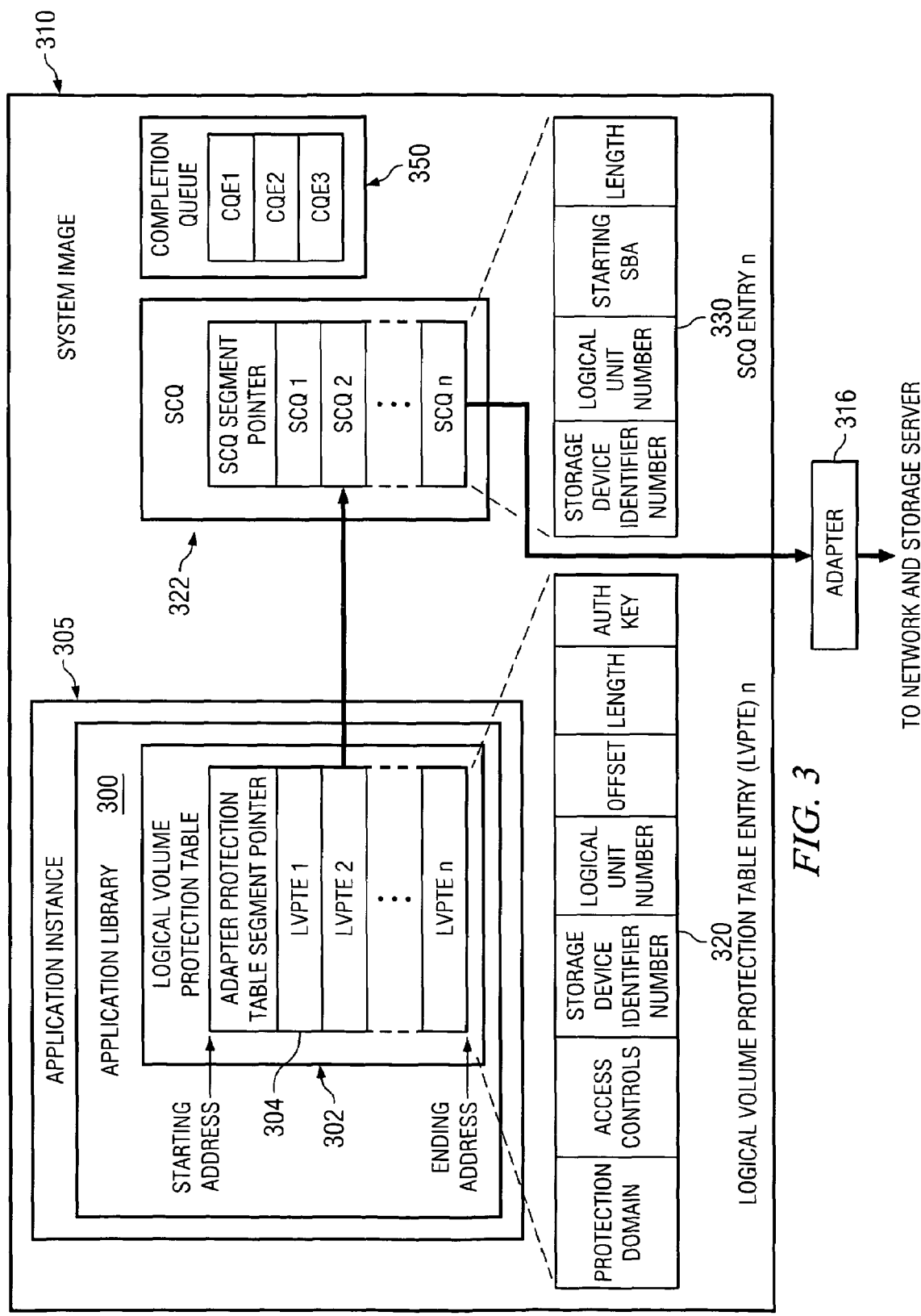
FIG. 3 is a diagram illustrating exemplary control structures used to translate and protect logical volume based storage in accordance with an exemplary embodiment of the present invention.

Turning next to FIG. 3, an example of a translation protection table (TPT) and storage command queue (SCQ) is depicted in accordance with one exemplary embodiment of the present invention. In this particular example embodiment of the present invention, logical volume based I/O operations are assumed to be utilized. An alternative file mode I/O based embodiment of the present invention will be described with reference to FIG. 13 hereafter.

As shown in FIG. 3, the translation protection table may comprise a logical volume protection table 302 in the application library 300. The logical volume protection table 302 contains an entry for each logical volume allocated to application instances running on the host system in association with system image 310. Each of these entries describes the storage device identifier number for the storage device(s) that make up the logical volume, the logical unit number (LUN), an offset into the logical volume or LUN address space for a storage block, and a length of the storage block in the logical volume or LUN. In some exemplary embodiments of the present invention, entries in the logical volume protection table 302 may further include the authentication key assigned to the application instance 305 by the storage server for accessing the logical volume, a protection domain for ensuring that only the application instance 305 for which the logical volume is allocated may access the logical volume protection table entry (LVPTE), and access controls that may identify whether the LVPTE is a valid LVPTE, i.e. has not been deleted, and which type of I/O access is permitted to the logical volume.

Logical volume protection table entry N 320 depicts an example entry in the logical volume protection table segment. Each entry in the logical volume protection table (LVPT) segment 304 contains a set of fields that are used to define that entry. Logical volume protection table entry N 320 contains the following fields: Protection Domain, Access Controls, Storage Device Identifier Number, Logical Unit Number, Offset, Length, and Authentication Key. The Protection Domain is a value that is provided to the application instance 305 when the LVPTE 320 is created in the LVPT segment 304. When the application instance 305 submits an I/O request directed to a particular logical volume, the application instance 305 provides a key value for identifying a particular LVPTE and a protection domain value that may be used to authenticate the application instance's ability to access the identified LVPTE. If the protection domain value in the I/O request matches the protection domain value in the LVPTE, then the I/O request may be further processed; otherwise, an error message may be returned.

The Access Controls identify whether the LVPTE is still valid or if it has been flagged as having been deleted or deallocated. If the LVPTE is no longer valid, then further processing of an I/O request targeting the LVPTE is aborted with an error message being returned. The Access Controls may further identify what types of I/O operations may be performed on the portion(s) of storage device(s) corresponding to the logical volume. If an I/O request identifies an I/O operation that is not permitted, then further processing of the I/O request may be aborted with an error message being returned.

The Storage Device Identifier Number may be, for example, a SCSI Identifier Number for the SCSI storage device or devices that make up the logical volume identified by the Logical Unit Number. The Logical Unit Number may be a SCSI LUN, for example. The SCSI Identifier Number (ID) and SCSI Logical Unit Number (LUN) are used to associate the LVPTE 320 with a specific SCSI device and a specific LUN within that device, respectively.

The Offset and Length are values that identify an offset to a starting address for a storage block in the logical volume and a length of the storage block. The Offset may be used to calculate a storage block address for the start of the storage block, e.g., a linear block address (LBA) for the storage block. The calculation of a LBA from the Offset is performed in a manner generally known in the art and thus, a detailed explanation is not provided herein.

The information contained in the fields of the LVPTE 320 may be used to create a storage command queue entry in the SCQ 322. That is, the Offset in the LVPTE 320 may be used to calculate a starting storage block address for a targeted storage block. This starting storage block address may be combined with the storage device identifier number, logical unit number, and length obtained from the LVPTE 320 and the authentication key to generate an "open" storage command for opening the logical volume corresponding to the LVPTE 320. Once opened, the starting storage block address may be combined with the storage device identifier number, logical unit number and length to generate subsequent I/O storage commands. These storage commands are placed in the SCQ 322 after they are generated so that they may be dispatched to the remotely located storage server.

The authentication key is a key value that was provided to the application instance 305 from the storage server when the application instance 305 requested allocation of a logical volume in the storage system, i.e. storage server and storage device(s). The authentication key uniquely identifies the application instance 305 as the only source that is capable of accessing the storage locations of the logical volume created by the storage server for that application instance 305. In one embodiment, the authentication key is stored in a register or other storage device in association with the application instance 305 such that only that application instance 305 can provide the authentication key when opening a logical volume. In another exemplary embodiment, the authentication key is stored in an entry of the logical volume protection table 302 for the logical volume and, by use of the protection domain, only the application instance 305 may access that entry in the logical volume protection table 302.

As shown in FIG. 3, the application instance 305 uses the application library 310, and the LVPT 302 within the application library 310, to generate storage commands that are placed in a storage command queue (SCQ) 322 of a system image 300. For illustration purposes, the system image 300 may be an operating system, such as Windows XP™, AIX™, Linux™, etc., or a special purpose software image. For purposes of the following description, the terms "system image" and "operating system" may be used interchangeably to refer to a system image, i.e. the current contents of system memory, which may include the operating system and any running application instances.

The storage command queue 322 is a queue of storage commands, such as storage command n 330, that are to be processed by the I/O adapter 316. The storage command queue 322 may be, for example, a SCSI command queue that contains SCSI commands that are processed by the I/O adapter 316 for transmission to a remotely located storage server via one or more networks. The use of a storage command queue and I/O adapter are generally known in the art and thus, a detailed explanation of the processing performed by the I/O adapter 316 in transmitting and receiving I/O transactions is not included herein. Suffice it to say, the storage command queue 322 and I/O adapter 316 operate in a manner generally known in the art.

Once storage commands are processed by the storage server (not shown), a completion message may be returned to the system image 300 via the adapter 316 and completion queue 350. The system image 300 or operating system may retrieve completion queue entries and process them to thereby inform the application instance 305 of the completion of a particular I/O storage request submitted by the application instance 305. The use of completion messages and completion queues is also generally known in the art and thus, a further detailed explanation of the processing involved is not provided herein.

Figure 4:
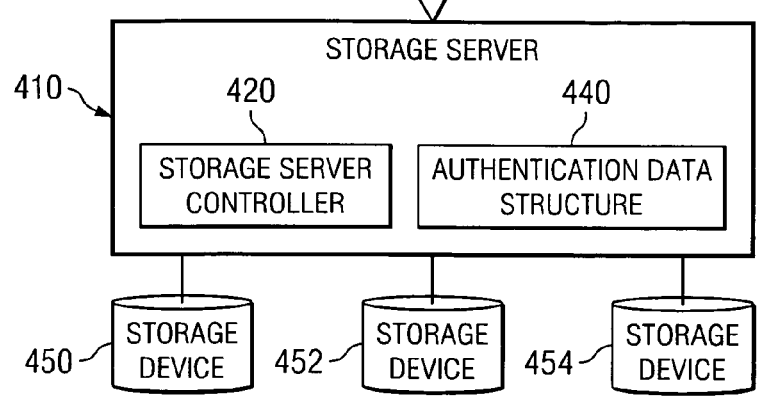
FIG. 4 is a diagram illustrating exemplary control structures used to pass a storage request from a user space middleware or application instance to a storage adapter in accordance with an exemplary embodiment of the present invention.

With reference next to FIG. 4, an exemplary diagram is provided illustrating the primary operational components of a storage system in accordance with an exemplary embodiment of the present invention. As shown in FIG. 4, the storage server 410 includes a storage server controller 420 which receives storage commands from application instances on host systems, such as application instance 224 on host system 200 in FIG. 2. These storage commands are placed in a processing queue 215 from which they are retrieved and processed by the storage server controller 420. The storage server controller 420 processes the storage commands and executes the I/O operations requested in the storage commands on one or more storage devices(s) 450, 452 and 454.

As part of this processing of storage commands, the storage server controller 420 may perform authentication checks on the storage commands to ensure that the application instances that are the source of the storage commands are permitted to access the storage locations targeted by the storage commands. Such authentication checks may be performed when an "open" storage command is received for opening a logical volume for access by an application instance during a session between the application instance and the storage server 410, for example.

In one exemplary embodiment of the present invention, the authentication check involves performing a lookup operation on the authentication data structure 440 of the storage device identifier number and logical unit number referenced in the storage command. This lookup operation will result in an entry being retrieved that correlates the storage device identifier, logical unit number, and an associated authentication key that was generated when the logical volume corresponding to the storage device identifier and logical unit number was created.

The storage server controller 420 may then compare the authentication key retrieved from the authentication data structure 440 with the authentication key received in the storage command. If there is a match, then the storage command originated from an application instance that is permitted to access the storage locations of the logical volume targeted by the storage command. As a result, the logical volume is opened for access by the application instance during a current session between the application instance and the storage server. Subsequent I/O requests from the application instance are translated into storage commands in a similar manner, except that the authentication key may or may not be incorporated into the storage command. These storage commands may be processed by the storage server in a manner generally known in the art so as to perform the requested I/O operations on the targeted portion(s) of the storage device(s) 450, 452 and/or 454. Upon completion of the requested I/O operations, the storage server controller 420 may return a completion message to the host system which is placed in a completion queue for processing by the system image. In this way, the application instance is informed of the completion of the requested I/O operations.

If the authentication keys do not match, then the storage command originated from an application instance that is not permitted to access the storage locations of the logical volume targeted by the storage command. In such a case, the logical volume is not opened for access by the application instance and an error message may be returned to the host system. This error message may be returned as a completion message that is placed in the completion queue for processing by the system image to thereby inform the application instance of the inability to complete the requested I/O operations.

With reference next to FIG. 5, a flowchart is provided outlining an exemplary operation of the present invention when creating a logical volume and its associated logical units for access by an application instance. It will be understood that each block, and combination of blocks, of the flowchart illustration in FIG. 5, and the flowchart illustrations in subsequent figures described hereafter, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As shown in FIG. 5, the operation starts by receiving a request from an application instance to create an operating system logical volume (step 510). In response, the operating system creates a new operating system logical volume ID (step 520) and executes a bootstrap algorithm to authorize the application instance's access to the SCSI device that will contain the SCSI LUN(s) associated with the OS logical volume, in accordance with the iSCSI standard (step 530).

The operating system then sends a request to the storage server to allocate one or more LUNs on one or more storage devices for the OS logical volume (step 540). The storage server determines if there is a storage device with sufficient SCSI LUN capacity available to satisfy the application instance's OS logical volume size (step 550). If so, then the LUN(s) are created on the identified storage device and are associated with the OS logical volume (step 560), such as associating the LUN(s) with the logical volume in the logical volume protection table, in a logical volume manager, or the like, for example.

An authentication key is then associated with the LUN and returned to the application instance (step 570). This may involve storing the authentication key in the logical volume protection table entry corresponding to the logical volume or storing the authentication key in a register or other storage device in association with the application instance. Thereafter, the application instance may use the authentication key to open the LUN associated with the OS logical volume in order to perform I/O operations on storage locations within the LUN.

If there is not sufficient SCSI LUN capacity on a storage device (step 550), then a determination is made as to whether the logical volume can be created using multiple SCSI devices with one or more LUNs (step 580). If so, the operation continues to step 560. If not, then the operation cannot be completed successfully and an error message may be returned to the application instance (step 590). The operation then terminates.

Figure 6:
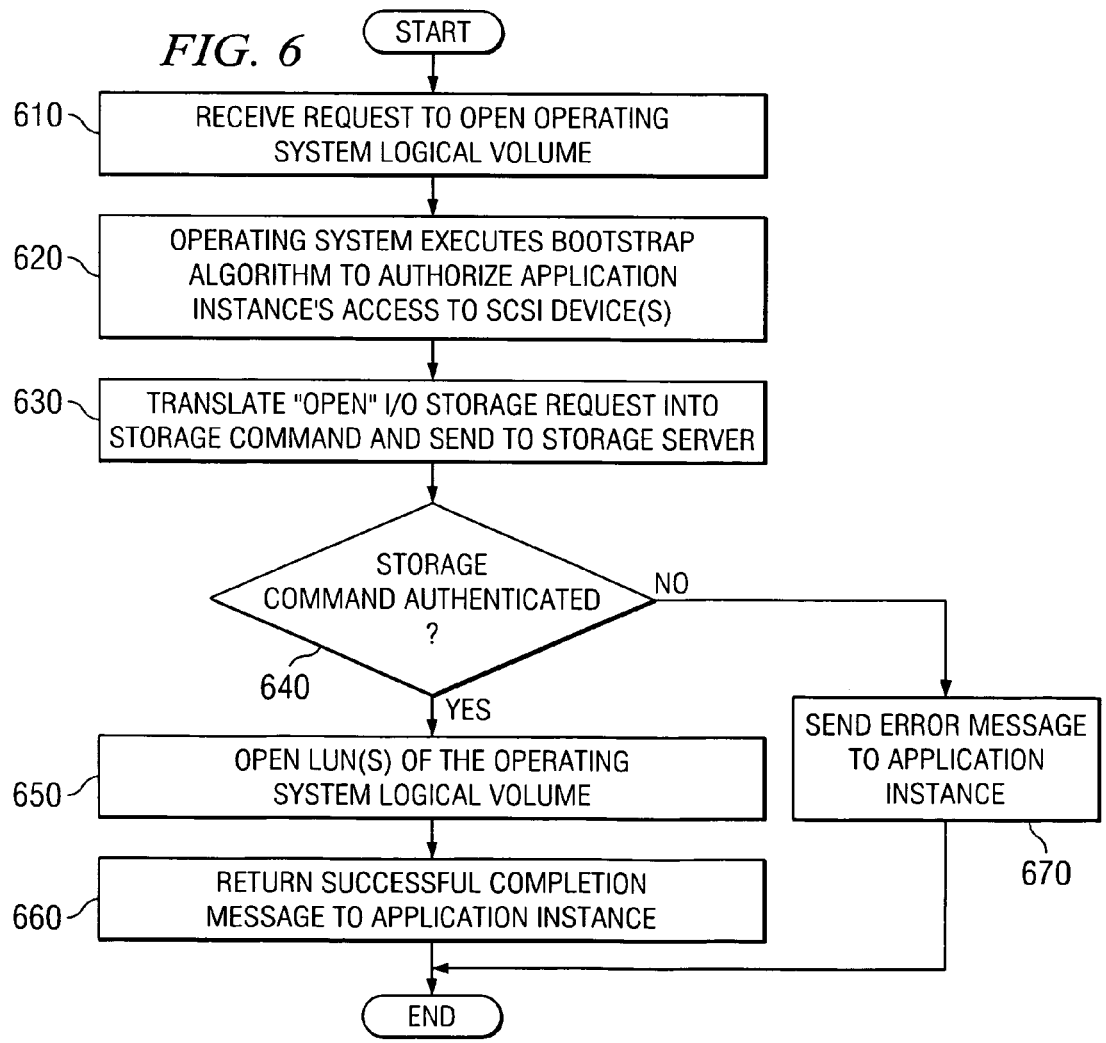
FIG. 6 is a flowchart outlining an exemplary operation of one exemplary embodiment of the present invention when opening one or more LUNs corresponding to an OS logical volume for access by an application instance.

FIG. 6 is a flowchart outlining an exemplary operation of the present invention when opening one or more LUNs corresponding to an OS logical volume for access by an application instance. As shown in FIG. 6, the operation starts by receiving a request from an application instance to open an OS logical volume (step 610). The request may include an authentication key that was supplied to the application instance when the OS logical volume and associated LUN(s) were generated, as in the operation outlined in FIG. 5, for example.

In response, the operating system executes a bootstrap algorithm to authorize the application instance's access to the SCSI device(s) that contain the SCSI LUN(s) associated with the OS logical volume (step 620). The "open" I/O storage request is then translated into a storage command and sent to the storage server (step 630). The storage server performs an authentication check to determine if the authentication key provided in the "open" I/O storage request matches an authentication key corresponding to the LUN(s) of the OS logical volume that is targeted by the "open" I/O storage request (step 640). If the authentication keys match, then the LUN(s) of the OS logical volume are opened (step 650) and a successful completion message is returned to the application instance (step 660). If the authentication keys do not match, then the "open" operation cannot be completed and an error message is returned to the application instance (step 670).

Having opened the LUNs of the OS logical volume for the current session between the application instance and the storage server, the application instance may thereafter submit I/O storage requests to the storage server using the translation protection table data structure of the present invention, as described previously. The authentication described above need only be performed when an "open" storage command is processed. Subsequent I/O requests from the application instance, and thus storage commands, need not be authenticated in the same manner. Once the application instance no longer needs to access the LUN(s), or upon the occurrence of a session close event, the LUN(s) may be closed.

Figure 7:
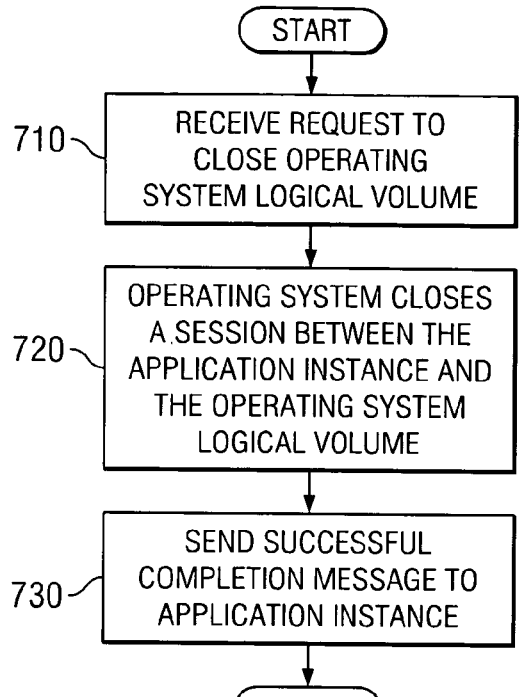
FIG. 7 is a flowchart outlining an exemplary operation of one exemplary embodiment of the present invention when closing a previously opened OS logical volume.

FIG. 7 is a flowchart outlining an exemplary operation of the present invention when closing a previously opened OS logical volume. As shown in FIG. 7, the operation starts with receiving a "close" request from an application instance to close an OS logical volume (step 710). In response, the OS closes a session between the application instance and the OS logical volume (step 720). This may be done, for example, by executing a close session iSCSI algorithm (see the iSCSI specification). A successful completion message is then returned to the application instance (step 730). Thereafter, the application instance can no longer access the OS logical volume until it is reopened.

As discussed above, once the application instance opens an OS logical volume, the application instance may perform I/O storage operations on the LUN(s) of the OS logical volume. For example, the application instance may perform read/write I/O operations on the opened OS logical volume using the translation protection table data structure available in the application library. The translation protection table in the application library is used to convert the I/O storage request obtained from the application instance into a storage command that may be processed by the storage server at a remotely located storage system.

Figure 8:
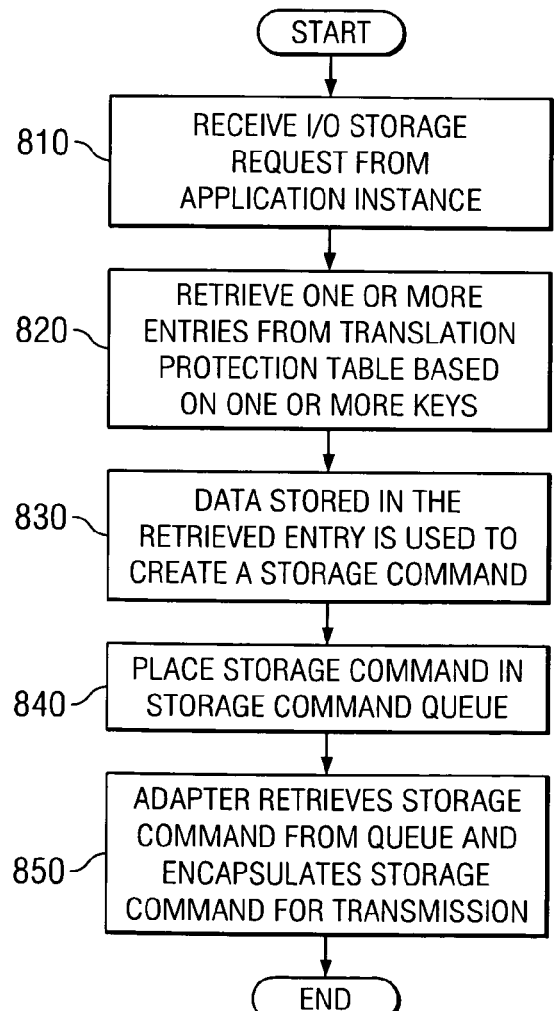
FIG. 8 is a flowchart outlining an exemplary operation of one exemplary embodiment of the present invention when processing an I/O storage request from an application instance.

FIG. 8 is a flowchart outlining an exemplary operation of the present invention when processing an I/O storage request from an application instance. As shown in FIG. 8, the operation starts by receiving an I/O storage request having one or more key values (step 810). The one or more key values are used to retrieve an entry from the translation protection table data structure corresponding to the key value (step 820).

The I/O storage request may be verified as coming from an application instance that may access the logical volume identified in the I/O storage request. This may be done by using a protection domain and access controls as previously mentioned above. This verification process is optional and is not necessary to the operation of the present invention and thus, is not explicitly shown in FIG. 8.

The storage device identifier, logical unit number, offset and length information in the retrieved entry are used to generate a storage command (step 830). The storage command is then placed in a storage command queue (step 840). The adapter then retrieves the storage command from the storage command queue and encapsulates the storage command into network data packets for transmission to the storage server (step 850). The operation then ends.

In addition to opening/closing OS logical volumes and submitting read/write I/O operations, various translation protection table management operations may be performed including creating logical volume protection table entries, querying logical volume protection table entry attributes, modifying logical volume protection table entry attributes, and deleting or destroying logical volume protection table entries. Each of these operations will be described in detail with reference to FIGS. 9-12 hereafter. In an exemplary embodiment of the present invention, the operations outlined in FIGS. 9-12 are performed by a system image or operating system in response to an invocation of a user space operation. While the exemplary embodiments have these operations being performed in a system image or operating system, the present invention is not limited to such. Rather, for example, the operations may be performed in a user space application, a hypervisor, or the like.

Figure 9:
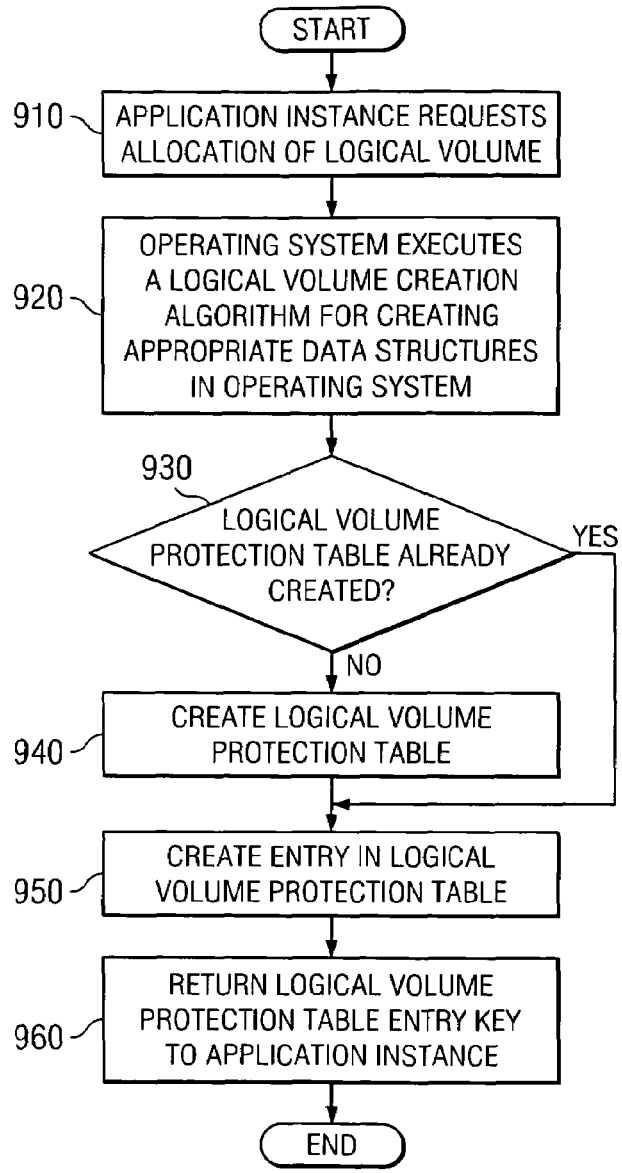
FIG. 9 is a flowchart outlining an exemplary operation of one exemplary embodiment of the present invention when creating a logical volume and corresponding translation protection table entries.

FIG. 9 is a flowchart outlining an exemplary operation of the present invention when creating a logical volume protection table entry. As shown in FIG. 9, the operation starts when an application instance requests the allocation of a logical volume to the application instance (step 910). In response, the operating system executes a logical volume creation algorithm for creating appropriate data structures in the operating system, such as in a logical volume manager (LVM), for accessing the logical volume (step 920). A determination is made as to whether the logical volume protection table has already been created (step 930). If not, the operating system creates the logical volume protection table (step 940).

Thereafter, or if the logical volume protection table has already been created, an entry in the logical volume protection table is created (step 950). This logical volume protection table entry may identify the storage device identifier number, logical unit number, offset to the starting address of the logical volume, the length of the LUNs, and an associated authentication key that is received from a storage server, as previously described above. The operating system then returns the logical volume protection table entry key values for the created entry to the application instance (step 960). The operation then ends.

Figure 10:
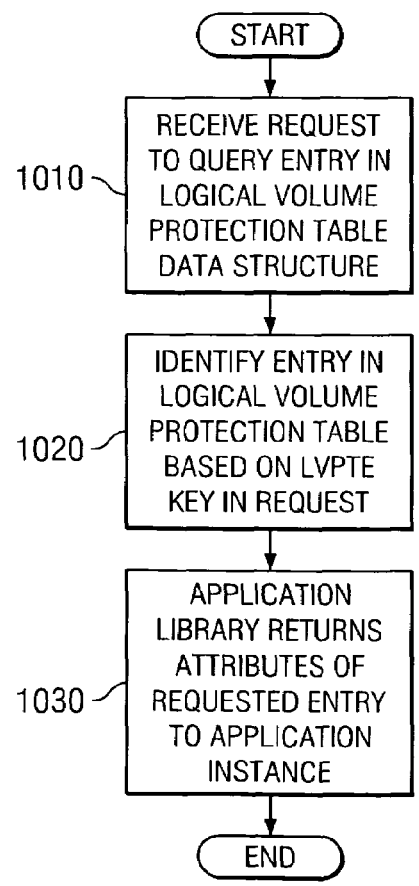
FIG. 10 is a flowchart outlining an exemplary operation of one exemplary embodiment of the present invention when querying a logical volume protection table for attribute information.

FIG. 10 is a flowchart outlining an exemplary operation of the present invention when querying a logical volume protection table for attribute information. As shown in FIG. 10, the operation starts by receiving a request from an application instance to query entries in the logical volume protection table residing in the application library (step 1010). The corresponding entry in the logical volume protection table is then identified based on a logical volume protection table entry key value provided in the query request (step 1020). The application library then returns the attributes of the requested entry to the application instance (step 1030) and the operation ends.

Figure 11:
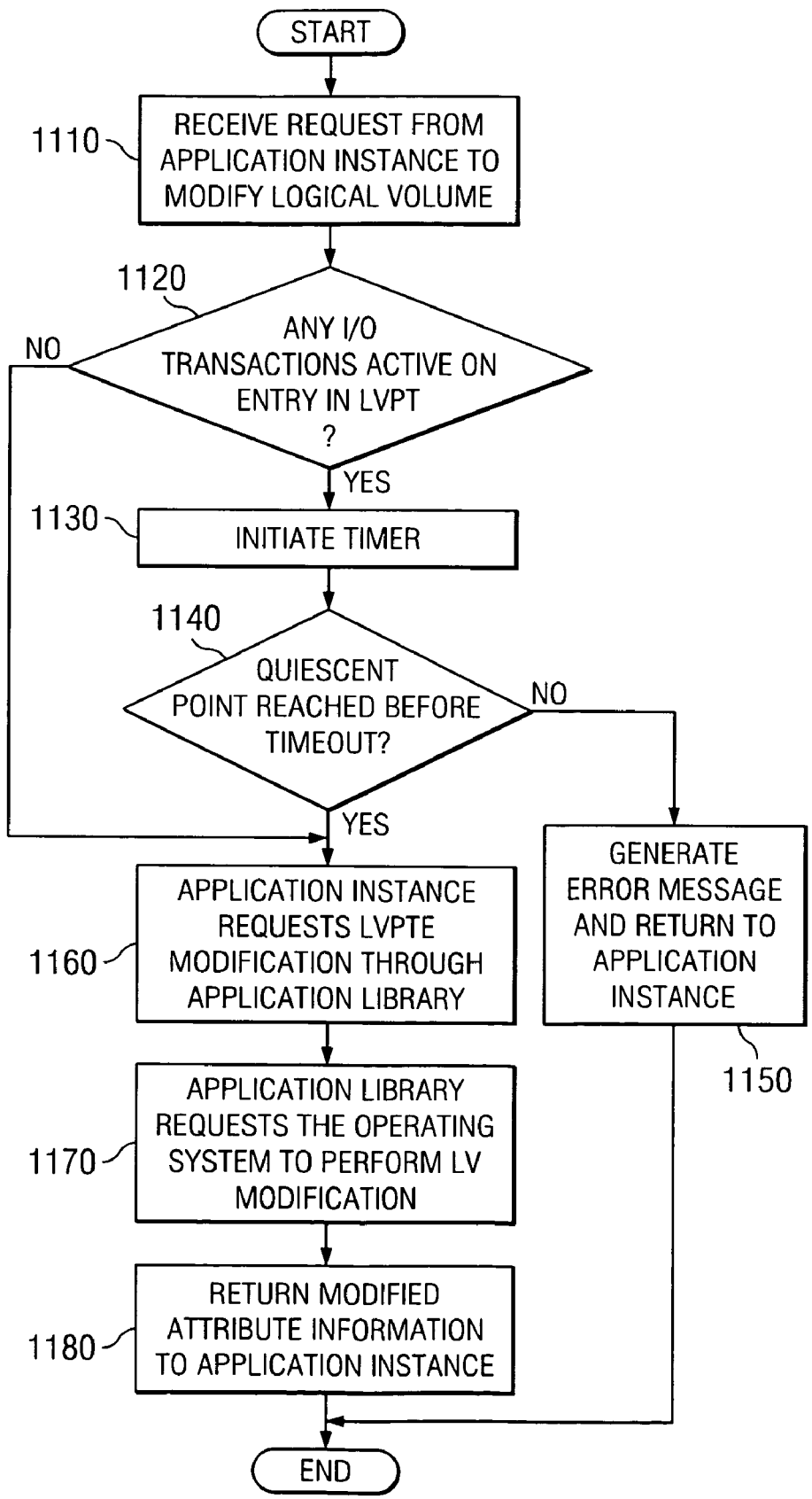
FIG. 11 is a flowchart outlining an exemplary operation of one exemplary embodiment of the present invention when modifying a logical volume protection table entry.

FIG. 11 is a flowchart outlining an exemplary operation of the present invention when modifying a logical volume protection table entry. As shown in FIG. 11, the operation starts by receiving a request from an application instance to modify a logical volume protection table entry (step 1110). It should be noted that at this point, the application instance has already opened the OS logical volume and owns the entire OS logical volume and the associated SCSI LUNs.

A determination is made as to whether there are any I/O transactions active on the entry or entries in the logical volume protection table that are to be modified (step 1120). If there are I/O transactions pending on the entry or entries, a timer is initiated (step 1130) and a determination is made as to whether the timer times out before a quiescent point is reached (step 1140). A quiescent point is a point at which no I/O transactions are active on the entry or entries. If the timer times out before the quiescent point is reached, then the application library generates an error result and returns it to the application instance (step 1150).

If there are no I/O transactions active on the entry or entries, or if the quiescent point is reached before the timer times out, the application requests a logical volume modification through the application library (step 1160). The application library then requests that the operating system perform the logical volume modification (step 1170). As part of this logical volume modification, the operating system may obtain an allocation of additional LUNs for the logical volume, for example, and thus, modifications to the attributes in the logical volume protection table entry for the logical volume may be required. The application library then returns the attributes of the modified logical volume protection table entry (step 1180) and the operation ends.

Figure 12:
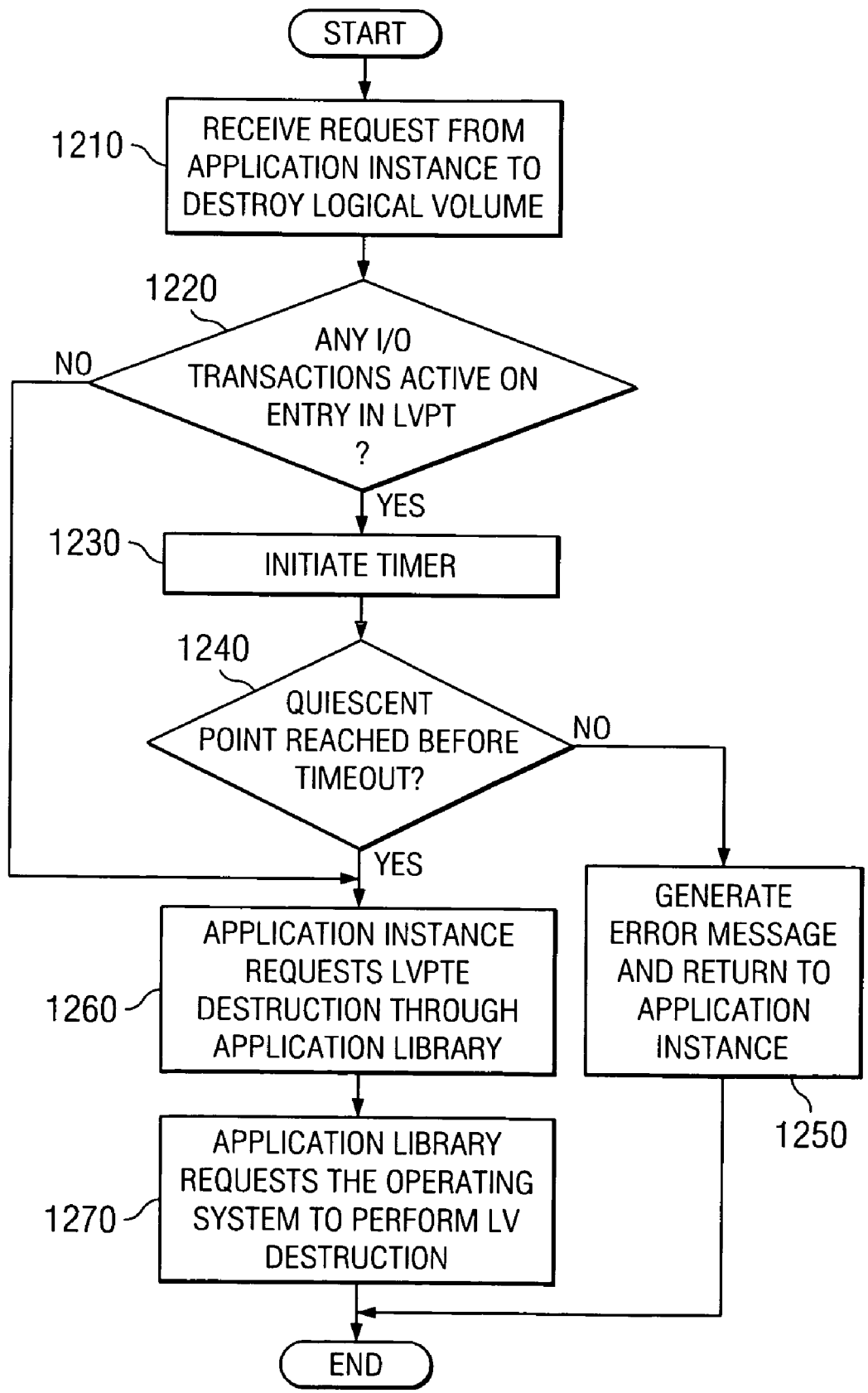
FIG. 12 is a flowchart outlining an exemplary operation of one exemplary embodiment of the present invention when deleting or destroying a logical volume protection table entry.

FIG. 12 is a flowchart outlining an exemplary operation of the present invention when deleting or destroying a logical volume protection table entry. As shown in FIG. 12, the operation starts by receiving a request from an application instance to delete or destroy a logical volume protection table entry (step 1210). Again, it should be noted that at this point, the application instance has already opened the OS logical volume and owns the entire OS logical volume and the associated SCSI LUNs.

A determination is made as to whether there are any I/O transactions active on the entry or entries in the logical volume protection table that are to be deleted or destroyed (step 1220). If there are I/O transactions pending on the entry or entries, a timer is initiated (step 1230) and a determination is made as to whether the timer times out before a quiescent point is reached (step 1240). A quiescent point is a point at which no I/O transactions are active on the entry or entries. If the timer times out before the quiescent point is reached, then the application library generates an error result and returns it to the application instance (step 1250).

If there are no I/O transactions active on the entry or entries, or if the quiescent point is reached before the timer times out, the application requests a logical volume destruction or deletion through the application library (step 1260). The application library then requests that the operating system perform the logical volume deletion or destruction (step 1270) and the operation terminates.

It should be noted that while the above flowcharts make reference to logical volume protection tables, the operations outlined above may also be applied to file mode I/O based embodiments of the present invention. That is, rather than creating, querying, modifying, and deleting entries in a logical volume protection table, the mechanisms of the present invention may also be used to perform such operations on a file name protection table and file extension protection table that includes entries for each file and its corresponding file extensions maintained in a file system of the operating system. Thus, during creation, a file name protection table entry may be generated along with its file extension protection table entry or entries. The file name protection table entry may include a protection domain, access control information, and a pointer to one or more file extension protection table entries corresponding to the file name protection table entry. The file extension protection table entry or entries may identify a storage device identifier number, logical unit number, offset and length. A file name key may then be returned to the application instance for later use in accessing the file name protection table entry to thereby access the file. Similarly, querying, modifying, and deletion may be performed with respect to such a file name protection table entry and/or file extension protection table entry or entries.

Figure 13:
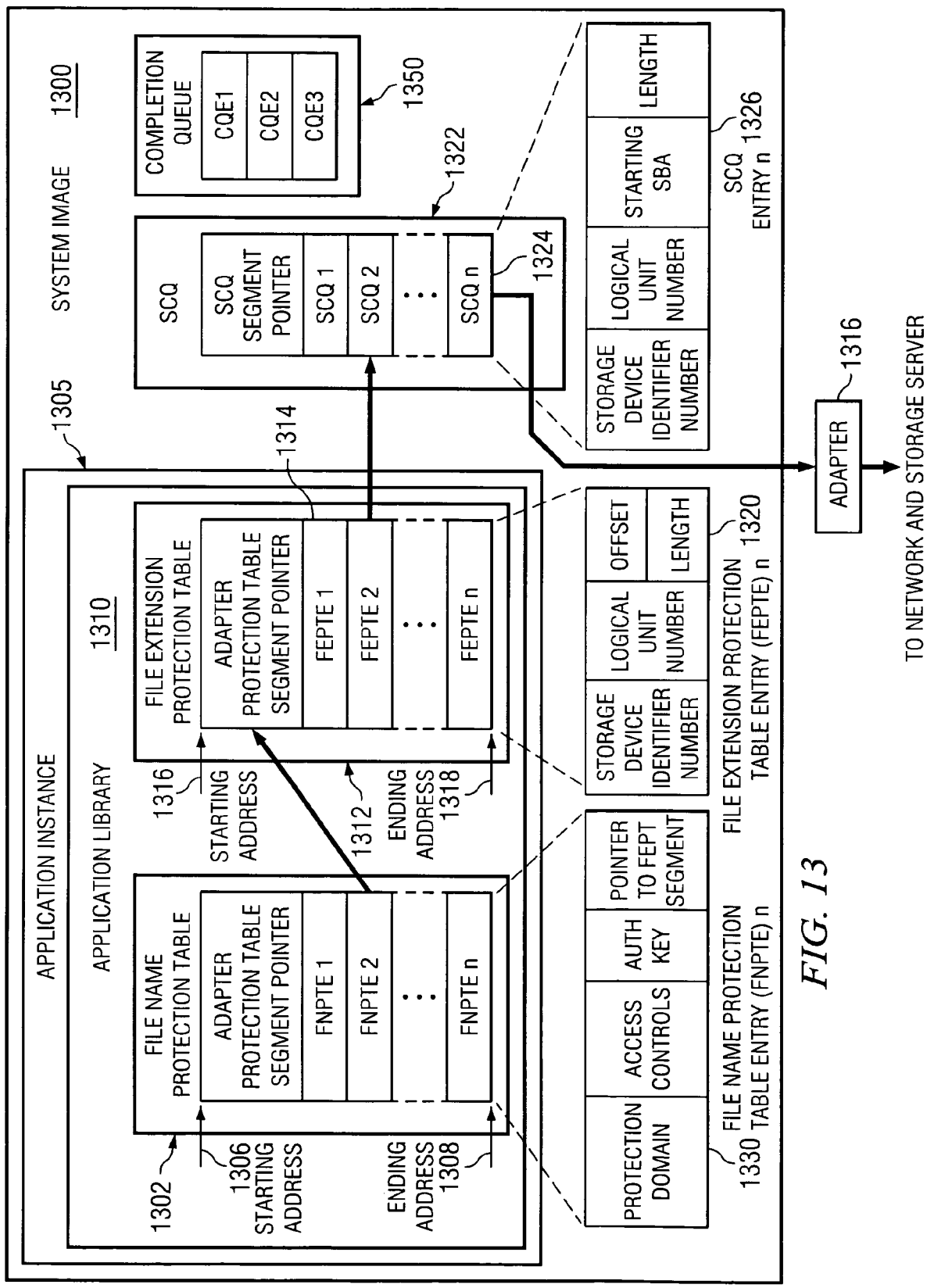
FIG. 13 is a diagram illustrating exemplary control structures used to translate and protect file name based storage in accordance with an exemplary embodiment of the present invention.

FIG. 13 is a diagram illustrating exemplary control structures used to translate and protect file name based storage in accordance with an exemplary embodiment of the present invention. Three data structures are shown in FIG. 13: the file name protection table data structure 1302, the file extension protection table data structure 1312, and the storage command queue (SCQ) 1322. The file name protection table data structure 1302 and file extension protection table data structure 1312 may together constitute a translation protection table (TPT) data structure of an application instance 1305, such as TPT 228 in FIG. 2. The file name protection table 1302 contains an entry for each file managed by the file system of the operating system or system image 1300. Entries in the file name protection table 1302, such as entry 1330 point to segments of the file extension protection table 1312 corresponding to the file represented by the file name protection table entry. The entries in the file name protection table 1302 may further include the protection domain and access controls for verifying the I/O requests sent by an application instance as previously described above.

In addition, the file name protection table 1302 may further include the authentication key that was assigned to the file corresponding to the file name protection table 1302 when the file was created. This authentication key may be used to open the file for a current session between an application instance and the storage server so that the application instance may perform I/O operations on the file. The process for opening a file is similar to the process described above for opening a logical volume. That is, an "open" storage command is sent to the remotely located storage system (not shown) via the adapter 1316 which is authenticated by the storage server of the remotely located storage system based on the authentication key in the "open" storage command. If the "open" storage command is verified as being authentic, the file is opened, in a current session between the application instance 1305 and the storage server, for I/O operations from the application instance 1305.

The file extension protection table 1312 contains an entry for each file extension. Each of these entries describes the storage device identifier number for the storage device(s) that make up the logical volume or LUN, the logical unit number, an offset into the logical volume or LUN address space for a storage block, and a length of the storage block in the logical volume or LUN. In the depicted example, the file extension protection table 1312 contains entries for each SCSI logical unit number (LUN).

The file extension protection table 1312 may be segmented into a set of file extension protection table segments. The segments may be interconnected using several data structures, including a B-tree, a tree made up of pointers in non-leaf nodes and pointers in leaf nodes, simple linked list, or the like. In the depicted example, file extension protection table segment 1314 uses a simple linked list where the first entry in the table is a pointer to the next table that contains file extension protection table entries.

File extension protection table entry N 1320 depicts an example entry in the file extension protection table segment. Each entry in the file extension protection table segment 1314 contains a set of fields that are used to define that entry. File extension protection table entry N 1320 contains the following fields: Storage Device Identifier Number, Logical Unit Number, Offset and Length. The Storage Device Identifier Number may be, for example, a SCSI Identifier Number for the SCSI storage device or device(s) that make up the logical volume identified by the Logical Unit Number. The Logical Unit Number may be a SCSI LUN, for example. The SCSI Identifier Number (ID) and SCSI Logical Unit Number (LUN) are used to associate the FEPT 1312 entry with a specific SCSI device and a specific LUN within that device, respectively.

As mentioned above, the Offset and Length are values that identify an offset to a starting address for a storage block in the logical volume and a length of the storage block. The Offset may be used to calculate a storage block address for the start of the storage block, e.g., a linear block address (LBA) for the storage block.

The information contained in the fields of the FEPT 1312 entry may be used to create a storage command queue entry in the SCQ 1322. That is, the Offset in the FEPT entry 1320 may be used to calculate a starting storage block address for a targeted storage block. This starting storage block address may be combined with the storage device identifier number, logical unit number, and length obtained from the FEPT 1312 entry. For an "open" I/O storage command, these values may further be combined with the authentication key passed by the application instance 1305, as obtained from the file name protection table 1302, based on a file name key referenced in the I/O request from the application instance.

As shown in FIG. 13, the application instance 1305 uses the application library 1310, and the FNPT 1302 and FEPT 1312 within the application library 1310, to generate storage commands that are placed in a storage command queue (SCQ)

1322 of a system image 1300. Once storage commands are processed by the storage server (not shown), a completion message may be returned to the system image 1300 via the adapter 1316 and completion queue 1350. The system image 1300 or operating system may retrieve completion queue entries and process them to thereby inform the application instance 1305 of the completion of a particular I/O storage request submitted by the application instance 1305.

The file mode I/O embodiment described above may make use of similar operations as outlined in FIGS. 5-12 to allocated files in the storage system, open files, close files, and submit I/O storage requests to the storage system. Rather than targeting logical volumes, however, the file mode I/O embodiment targets particular files and file extensions. That is, the application instance may request the allocation of a file in the storage system which is processed in a similar manner as the request for the creation of a logical volume outlined in FIG. 5. As a result, an authentication key for accessing the file may be returned to the application instance and stored in the file name protection table 1302, or alternatively in the file extension protection table 1312 in association with the file extensions corresponding to the file.

This authentication key may likewise be used to open the file once the file has been allocated by the storage system in a similar manner as outlined in FIG. 6 above. Once opened, the application instance may perform I/O operations to the file by sending I/O requests having a file name key (FN_Key) and file extension key (FE_Key) for identifying a particular entry in the file name protection table 1302 and file extension protection table 1312. The I/O requests may further include a protection domain and identifier of a type of I/O operation to be performed such that verifications, as previously described above, may be performed. Such I/O requests are converted to I/O storage commands using the information stored in the file name protection table 1302 and file extension protection table 1312. This operation is outlined for logical volumes in FIG. 8 above.

In addition to these operations, the closing of a file and creation of file name protection table and file extension protection table entries may be performed in a similar manner as the logical volume based operations in FIGS. 7 and 9. Moreover, the querying of file name protection table entries and/or file extension protection table entry attributes, modification of file name protection table entries and/or file extension protection table entry attributes, and deletion of file name protection table entries and/or file extension protection table entries may be performed in a similar manner as the operations for logical volumes outlined in FIGS. 10-12.

Thus, with the present invention, mechanisms are provided for enabling direct I/O between an application instance and a remotely located network attached storage device via a storage server. It should be noted that, while the above mechanisms of the exemplary embodiments of the present invention make use of the operating system or system image to perform a number of operations with regard to the creation and management of the translation protection table entries, these operations are not generally performed with each I/O storage request. That is, the operating system or system image is only involved in the opening/closing of an OS logical volume and the setup of the translation protection table entries. The operating system or system image is not required in order to process each actual I/O storage request submitted by the middleware or application instance since the application can use the translation protection table and mechanisms described above to process the I/O storage request. Furthermore, the authentication is performed by the storage server and not the operating system. As a result, the present invention eliminates the context switches, and their associated overhead, required by prior art mechanisms, as explained in the background of the invention above.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing input/output (I/O) operations with a remotely located storage system, comprising:

receiving an I/O request from an application instance, wherein the I/O request includes a key value for identifying an entry in a translation protection table data structure, and wherein the I/O request targets a portion of a storage device in the remotely located storage system upon which an I/O operation is to be performed;

retrieving an entry from a translation protection table based on the key value, wherein the entry includes an identifier of the storage device and a logical unit number corresponding to the portion of the storage device targeted by the I/O request;

generating a storage command based on the identifier of the storage device and the logical unit number retrieved with the entry from the translation protection table;

placing the storage command in a storage command queue for transmission to the remotely located storage system;

receiving, from the application instance, a request to open the portion of the storage device wherein the request includes an authentication key;

sending a command, having the authentication key, to the remotely located storage system to open the portion of the storage device;

returning results of the command to open the portion of the storage device to the application instance;

receiving, from the application instance, a request to allocate a logical unit of the storage device to the portion of the storage device for input/output operations of the application instance;

sending an allocate command, generated based on the received request to allocate the logical unit, to the remotely located storage system; and receiving a response from the remotely located storage system identifying an authentication key for use in opening the logical unit of the portion of the storage device for I/O operations, wherein the remotely located storage system performs authentication on the command to open the portion of the storage device based on the authentication key, and wherein the authentication key is an authentication key generated and provided by the remotely located storage system to the application instance and is stored in a storage device of the data processing system that is only accessible by the application instance.

2. The method of claim 1, wherein the translation protection table is part of an application library of a system image of the data processing system and contains an entry for each portion of each storage device, of the remotely located storage system, allocated to application instances running on the data processing system in association with the system image.

3. The method of claim 1, wherein each entry in the translation protection table includes a protection domain for a corresponding application instance and the authentication key for the corresponding application instance, and wherein only the corresponding application instance is able to access the authentication key in the entry due to the authentication key being associated with the protection domain via the entry in the translation protection table.

4. The method of claim 1, wherein the portion of the storage device is a logical volume comprising one or more logical unit numbers (LUNs) of the storage device.

5. The method of claim 1, wherein the portion of the storage device is a file comprising one or more logical unit numbers (LUNs) of the storage device.

6. The method of claim 1, further comprising:
storing, in the translation protection table data structure, an identifier of the authentication key in association with an identifier of the portion of the storage device.

7. The method of claim 6, further comprising:
retrieving, from the entry retrieved from the translation protection table, the authentication key;
generating an open command to open the portion of the storage device, wherein the open command includes the authentication key; and
transmitting the open command to the remotely located storage system to thereby open the logical unit of the portion of the storage device for I/O operations during a current session between the application instance and the remotely located storage system, wherein the remotely located storage system opens the logical unit of the portion of the storage device for I/O operations only when the remotely located storage system verifies that the application instance is permitted to access the logical unit of the portion of the storage device based on the authentication key in the open command.

8. The method of claim 1, further comprising:
receiving a request to create an entry in the translation protection table data structure for the portion of the storage device;
creating an entry in the translation protection table data structure for the portion of the storage device; and
returning a translation protection table key that corresponds to the created entry.

9. The method of claim 8, wherein the entry includes a storage device identifier number, a logical unit number, an offset, and a length.

10. The method of claim 9, wherein the entry further includes at least one of a protection domain, access control information, or an authentication key.

11. The method of claim 1, further comprising:
receiving a request to query an entry in the translation protection table data structure for the portion of the storage device;
identifying the entry in the translation protection table data structure for the portion of the storage device; and
returning attributes of the entry in the translation protection table data structure.

12. A method, in a data processing system, for performing input/output (I/O) operations with a remotely located storage system, comprising:
receiving an I/O request from an application instance, wherein the I/O request includes a key value for identifying an entry in a translation protection table data structure, and wherein the I/O request targets a portion of a storage device in the remotely located storage system upon which an I/O operation is to be performed;
retrieving an entry from a translation protection table based on the key value, wherein the entry includes an identifier of the storage device and a logical unit number corresponding to the portion of the storage device targeted by the I/O request;
generating a storage command based on the identifier of the storage device and the logical unit number retrieved with the entry from the translation protection table;
placing the storage command in a storage command queue for transmission to the remotely located storage system;
receiving, from the application instance, a request to open the portion of the storage device wherein the request includes an authentication key;
sending a command, having the authentication key, to the remotely located storage system to open the portion of the storage device;
returning results of the command to open the portion of the storage device to the application instance;
receiving a request to modify an entry in the translation protection table data structure for the portion of the storage device;
modifying the entry in the translation protection table data structure;
returning attributes of the modified entry in the translation protection table; and
determining if there are any active transactions on the entry in the translation protection table data structure, wherein the data processing system modifies the entry in the translation protection table data structure only if there are no active transactions on the entry, wherein the remotely located storage system performs authentication on the command to open the portion of the storage device based on the authentication key, and wherein the authentication key is an authentication key generated and provided by the remotely located storage system to the application instance and is stored in a storage device of the data processing system that is only accessible by the application instance.

13. The method of claim 12, further comprising:
initiating a timer if there is an active transaction on the entry in the translation protection table data structure;
determining if the timer times out prior to a quiescent point being reached; and
generating an error if the timer times out prior to the quiescent point being reached.

14. A method, in a data processing system, for performing input/output (I/O) operations with a remotely located storage system, comprising:
receiving an I/O request from an application instance, wherein the I/O request includes a key value for identifying an entry in a translation protection table data structure, and wherein the I/O request targets a portion of a storage device in the remotely located storage system upon which an I/O operation is to be performed;

retrieving an entry from a translation protection table based on the key value, wherein the entry includes an identifier of the storage device and a logical unit number corresponding to the portion of the storage device targeted by the I/O request;

generating a storage command based on the identifier of the storage device and the logical unit number retrieved with the entry from the translation protection table;

placing the storage command in a storage command queue for transmission to the remotely located storage system;

receiving, from the application instance, a request to open the portion of the storage device wherein the request includes an authentication key;

sending a command, having the authentication key, to the remotely located storage system to open the portion of the storage device;

returning results of the command to open the portion of the storage device to the application instance;

receiving a request to delete an entry in the translation protection table data structure for the portion of the storage device;

marking the entry in the translation protection table data structure as being invalid; and determining if there are any active transactions on the entry in the translation protection table data structure, wherein the data processing system marks the entry in the translation protection table data structure as being invalid only if there are no active transactions on the entry, wherein the remotely located storage system performs authentication on the command to open the portion of the storage device based on the authentication key, and wherein the authentication key is an authentication key generated and provided by the remotely located storage system to the application instance and is stored in a storage device of the data processing system that is only accessible by the application instance.

15. The method of claim 14, further comprising:

initiating a timer if there is an active transaction on the entry in the translation protection table data structure;

determining if the timer times out prior to a quiescent point being reached; and generating an error if the timer times out prior to the quiescent point being reached.

\* \* \* \* \*